US012640814B2

(12) United States Patent
Takeshita et al.

(10) Patent No.: US 12,640,814 B2
(45) Date of Patent: May 26, 2026

(54) OPTICAL TRANSMISSION SYSTEM, AND OPTICAL TRANSMISSION METHOD

(71) Applicant: NEC Corporation, Tokyo (JP)

(72) Inventors: Hitoshi Takeshita, Tokyo (JP); Keiichi Matsumoto, Tokyo (JP); Hidemi Noguchi, Tokyo (JP); Kohei Hosokawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 375 days.

(21) Appl. No.: 18/025,109

(22) PCT Filed: Sep. 11, 2020

(86) PCT No.: PCT/JP2020/034525
§ 371 (c)(1),
(2) Date: Mar. 7, 2023

(87) PCT Pub. No.: WO2022/054242
PCT Pub. Date: Mar. 17, 2022

(65) Prior Publication Data
US 2023/0327767 A1     Oct. 12, 2023

(51) Int. Cl.
*H04B 10/291* (2013.01)
*H01S 3/067* (2006.01)
(Continued)

(52) U.S. Cl.
CPC ..... *H04B 10/2912* (2013.01); *H01S 3/06737* (2013.01); *H01S 3/094003* (2013.01); *H04J 14/05* (2023.08)

(58) Field of Classification Search
None
See application file for complete search history.

(56) References Cited

U.S. PATENT DOCUMENTS 9,344,779 B2 * 5/2016 Sethumadhavan . H04J 14/0212
9,362,708 B2 * 6/2016 Ryf ..................... H01S 3/06737
(Continued)

FOREIGN PATENT DOCUMENTS

JP     2015-167158 A     9/2015
JP     2016-161603 A     9/2016
(Continued)

OTHER PUBLICATIONS

International Search Report for PCT Application No. PCT/JP2020/034525, mailed on Dec. 15, 2020.
(Continued)

*Primary Examiner* — Jai M Lee

(57) ABSTRACT
The optical transmission system of the present invention includes a multi-core transmission path which includes a plurality of cores, and in which optical signals propagate through the plurality of cores, a first optical repeating means for amplifying the optical signals by individually exciting first multi-core optical amplification mediums, and a second optical repeating means for amplifying the optical signals by collectively exciting second multi-core optical amplification mediums, wherein the first optical repeating means is positioned spaced apart from the second optical repeating means by a distance determined on the basis of either a first transmissible distance due to the first optical repeating means and a second transmissible distance due to the second optical repeating means.

11 Claims, 12 Drawing Sheets

(51) Int. Cl.
    *H01S 3/094*    (2006.01)
    *H04J 14/00*    (2006.01)

(56)                References Cited

U.S. PATENT DOCUMENTS

| | | | | |
|---|---|---|---|---|
| 9,660,762 | B2 * | 5/2017 | Le Taillandier De Gabory | .......... H04B 10/2581 |
| 9,729,229 | B2 * | 8/2017 | Le Taillandier De Gabory | .......... H04B 10/6164 |
| 11,264,776 | B2 * | 3/2022 | Le Taillandier De Gabory | .......... H01S 3/094061 |
| 11,329,444 | B2 * | 5/2022 | Le Taillandier de Gabory | ........... H01S 3/10015 |
| 11,398,711 | B2 * | 7/2022 | Nakamura | ............ H01S 3/1608 |
| 11,418,260 | B2 * | 8/2022 | Alic | .................. H04L 25/03006 |
| 11,476,635 | B2 * | 10/2022 | Mizuno | .............. H01S 3/06754 |
| 11,824,320 | B2 * | 11/2023 | Yanagimachi | ...... H01S 3/10069 |
| 11,881,675 | B2 * | 1/2024 | Takeshita | ............ H01S 3/06737 |
| 11,990,727 | B2 * | 5/2024 | Le Taillandier De Gabory | .......... H01S 3/094069 |
| 12,034,269 | B2 * | 7/2024 | Mizuno | ............... H01S 3/06737 |
| 2015/0085352 | A1 * | 3/2015 | Ryf | ................... H01S 3/094007 359/341.1 |
| 2019/0140418 | A1 | 5/2019 | Le Taillandier De Gabory et al. | |
| 2019/0221987 | A1 | 7/2019 | Le Taillandier De Gabory et al. | |
| 2021/0028590 | A1 * | 1/2021 | Le Taillandier De Gabory | ......... H04B 10/2916 |
| 2021/0296847 | A1 | 9/2021 | Mizuno et al. | |
| 2023/0327767 | A1 * | 10/2023 | Takeshita | ................ H04J 14/05 |

FOREIGN PATENT DOCUMENTS

| | | | | |
|---|---|---|---|---|
| JP | 2019-513302 | A | 5/2019 | |
| JP | 2019-532503 | A | 11/2019 | |
| JP | 2020-009999 | A | 1/2020 | |
| WO | WO-2017183061 | A1 * | 10/2017 | ......... H01S 3/06737 |

OTHER PUBLICATIONS

English translation of Written opinion for PCT Application No. PCT/JP2020/034525, mailed on Dec. 15, 2020.

* cited by examiner

OPTICAL TRANSMISSION SYSTEM, AND OPTICAL TRANSMISSION METHOD

This application is a National Stage Entry of PCT/JP2020/034525 filed on Sep. 11, 2020, the contents of all of which are incorporated herein by reference, in their entirety.

TECHNICAL FIELD

The present invention relates to an optical transmission system and an optical transmission method, and particularly, relates to an optical transmission system and an optical transmission method that use a multi-core optical fiber.

BACKGROUND ART

Due to rapid expansion of mobile traffic and a video service, and the like, expansion of communication capacity in a core network is required. A demand for capacity expansion tends to continue in future as well. Expansion of communication capacity has so far been achieved by using a time multiplexing technique and a wavelength division multiplexing technique. The time multiplexing technique and the wavelength division multiplexing technique have been applied to an optical communication system by a single-core optical fiber.

In order to further expand communication capacity, a spatial multiplexing technique being a multiplexing technique on a different level from a conventional multiplexing technique has been developed. The spatial multiplexing technique includes a multi-core technique that increases the number of cores per optical fiber and a multi-mode technique that increases the number of propagation modes. Each of the number of cores and the number of modes being used in conventional optical fiber communication is one. Thus, it is possible to significantly expand communication capacity by increasing the number of cores and the number of modes.

As an optical amplification method suitable for a multi-core optical fiber used in the multi-core technique, there are two methods including a core excitation method and a clad excitation method. In the core excitation method, intensity of an optical signal optically transmitted through each core is individually amplified by use of an individual excitation light source for each core. Meanwhile, in the clad excitation method, intensity of an optical signal optically transmitted through each core is collectively amplified by use of a common excitation light source. Further, a hybrid excitation method combining a core excitation method and a clad excitation method has been proposed.

One example of an optical amplification repeater by such a hybrid excitation method is described in PTL 1. The related optical amplification repeater described in PTL 1 includes a multi-mode optical demultiplexer, a multi-core optical amplifier of individual excitation (core excitation), a multi-core optical amplifier of collective excitation, a waveform shaper, and a multi-mode optical multiplexer.

Herein, the multi-core optical amplifier of collective excitation is a multi-core optical amplifier of clad excitation with N=7 channels. A multi-core optical amplifier of individual excitation adjusts an amplification amount of each of pieces of light transmitted through a plurality of optical transmission paths by a plurality of optical amplifiers. A related optical amplification repeating system is configured by use of a plurality of related optical amplification repeaters and a plurality of optical fibers.

According to the related optical amplification repeater, advantages of both power saving performance and controllability can be acquired by using a multi-core optical amplifier of collective excitation and a multi-core optical amplifier of individual excitation together.

CITATION LIST

Patent Literature

[PTL 1] Japanese Unexamined Patent Application Publication No. 2020-9999

SUMMARY OF INVENTION

Technical Problem

As described above, a related optical amplification repeating system has a configuration in which an optical amplification repeater by a hybrid excitation method being equipped with a multi-core optical amplifier of collective excitation and a multi-core optical amplifier of individual excitation is provided for each repeating point. No common component (hardware) exists between the multi-core optical amplifier of collective excitation and the multi-core optical amplifier of individual excitation being included in the hybrid excitation method optical amplification repeater. Thus, in the hybrid excitation method optical amplification repeater, the number of components increases as compared with the single core optical repeater, and an optical repeater device becomes large in size.

In other words, in an optical transmission system equipped with an optical amplification repeater by a hybrid excitation method at each repeating point, such as the related optical amplification repeating system, each optical amplification repeater needs as many lasers for core excitation as the number of cores. Further, a fan-in/fan-out device for introducing an individual piece of excitation light into each core also needs to be provided for each optical amplification repeater. Thus, the number of components (hardware amount) in the whole optical transmission system becomes large, and cost increases.

In this way, an optical transmission system having a configuration in which optical intensity of an optical signal propagating through each core of a multi-core optical transmission path is individually controlled for each optical repeater has a problem that the number of components of the whole optical transmission system increases and cost increases.

An object of the present invention is to provide an optical transmission system and an optical transmission method that solve the problem described above.

Solution to Problem

An optical transmission system according to the present invention includes: a multi-core optical transmission path that includes a plurality of cores, and in which an optical signal propagates through the plurality of cores; a first optical repeating means for amplifying the optical signal by individually exciting a first multi-core optical amplification medium; and a second optical repeating means for amplifying the optical signal by collectively exciting a second multi-core optical amplification medium, wherein the first optical repeating means is positioned apart from the second optical repeating means by a distance determined based on one of a first transmittable distance by the first optical repeating means and a second transmittable distance by the second optical repeating means.

An optical transmission method according to the present invention includes: locating a first multi-core optical amplification medium and a second multi-core optical amplification medium at different positions of a multi-core optical transmission path; propagating an optical signal through a plurality of cores of the multi-core optical transmission path; amplifying the optical signal by individually exciting the first multi-core optical amplification medium; and amplifying the optical signal by collectively exciting the second multi-core optical amplification medium, wherein the first multi-core optical amplification medium is positioned apart from the second multi-core optical amplification medium by a distance determined based on one of a first transmittable distance of the optical signal when the first multi-core optical amplification medium is individually excited, and a second transmittable distance of the optical signal when the second multi-core optical amplification medium is collectively excited.

Advantageous Effects of Invention

An optical transmission system and an optical transmission method according to the present invention are able to suppress an increase in the number of components of the whole optical transmission system, even when having a configuration in which optical intensity of an optical signal propagating through each core of a multi-core optical transmission path is individually controlled.

4

Figure 7A:
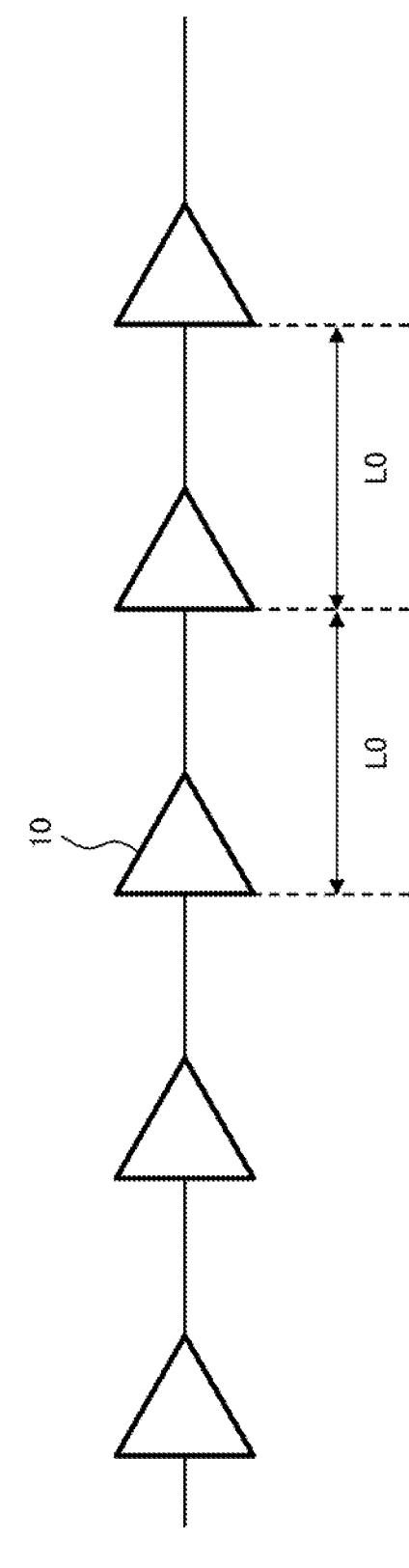
FIG. 7A is a block diagram illustrating a configuration of an optical transmission system according to a related method.
Figure 7B:
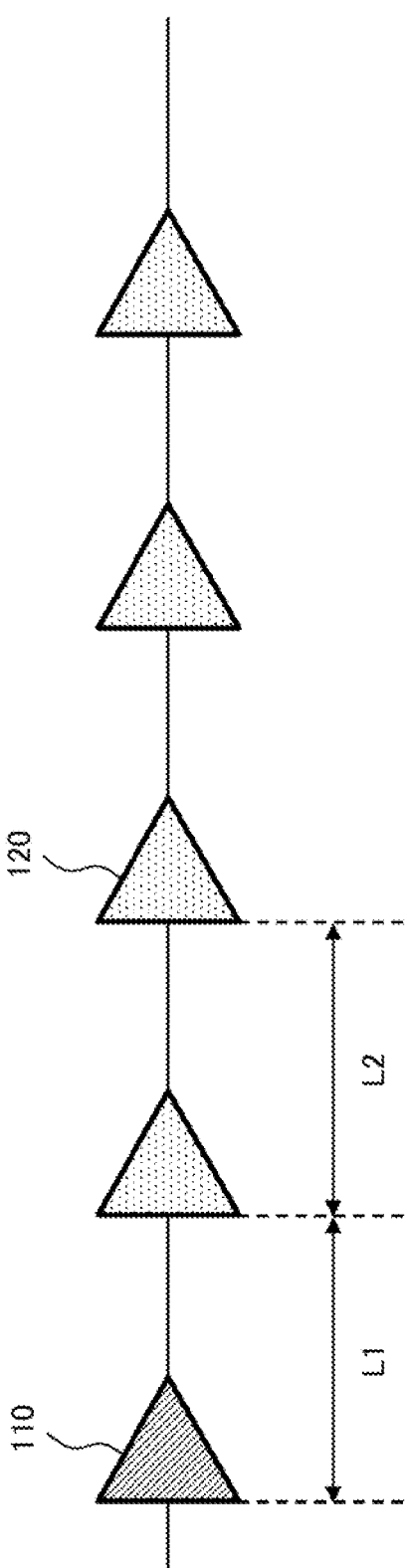
FIG. 7B is a diagram for describing an effect by the optical transmission system according to the first example embodiment of the present invention, and is a block diagram illustrating a configuration of the optical transmission system when a first transmittable distance and a second transmittable distance are equal.
Figure 7C:
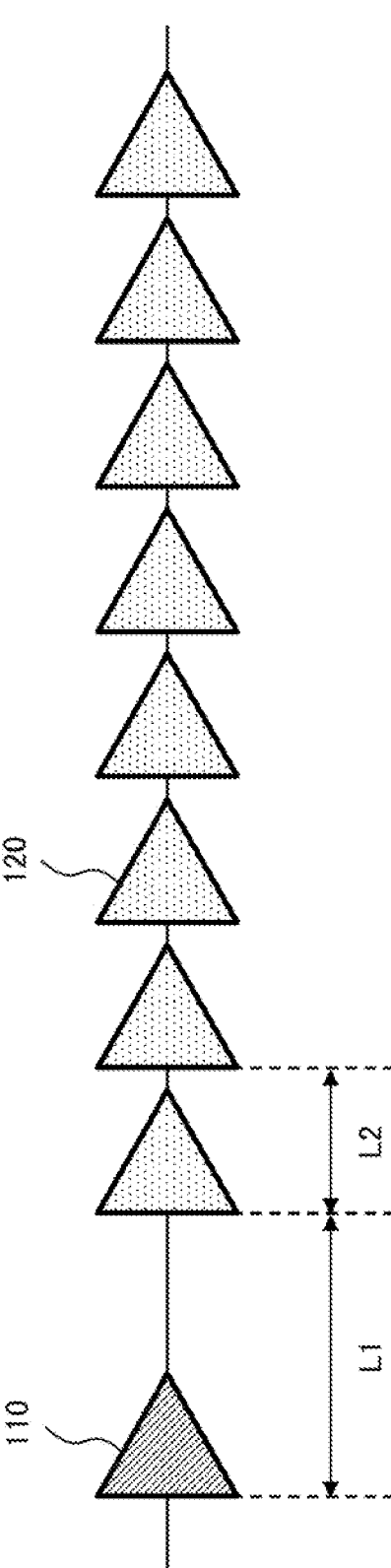

FIG. 7C is a diagram for describing an effect by the optical transmission system according to the first example embodiment of the present invention, and is a block diagram illustrating a configuration of the optical transmission system when the second transmittable distance is half the first transmittable distance.

Figure 8:
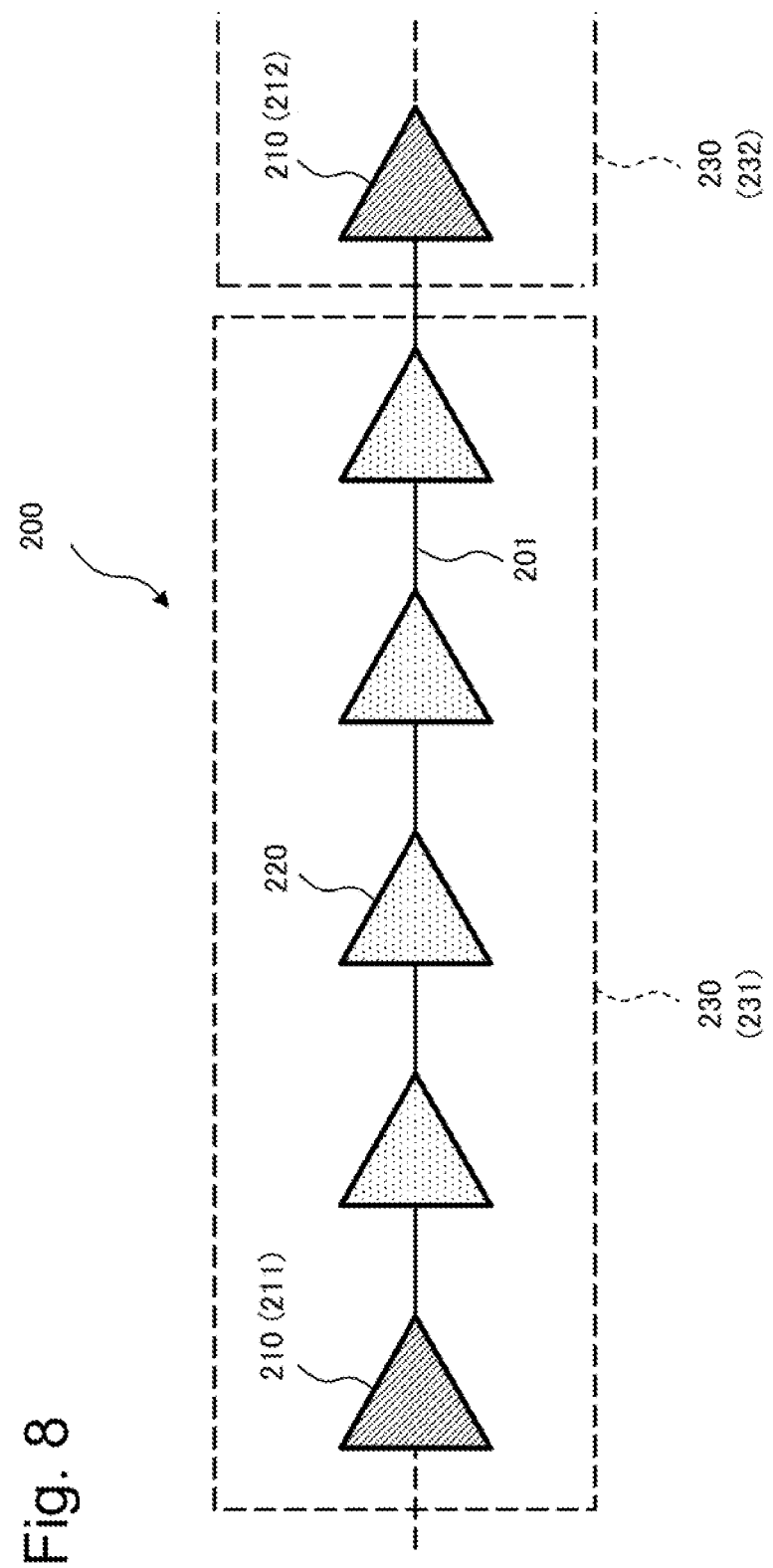

FIG. 8 is a block diagram illustrating a configuration of an optical transmission system according to a second example embodiment of the present invention.

Figure 9:
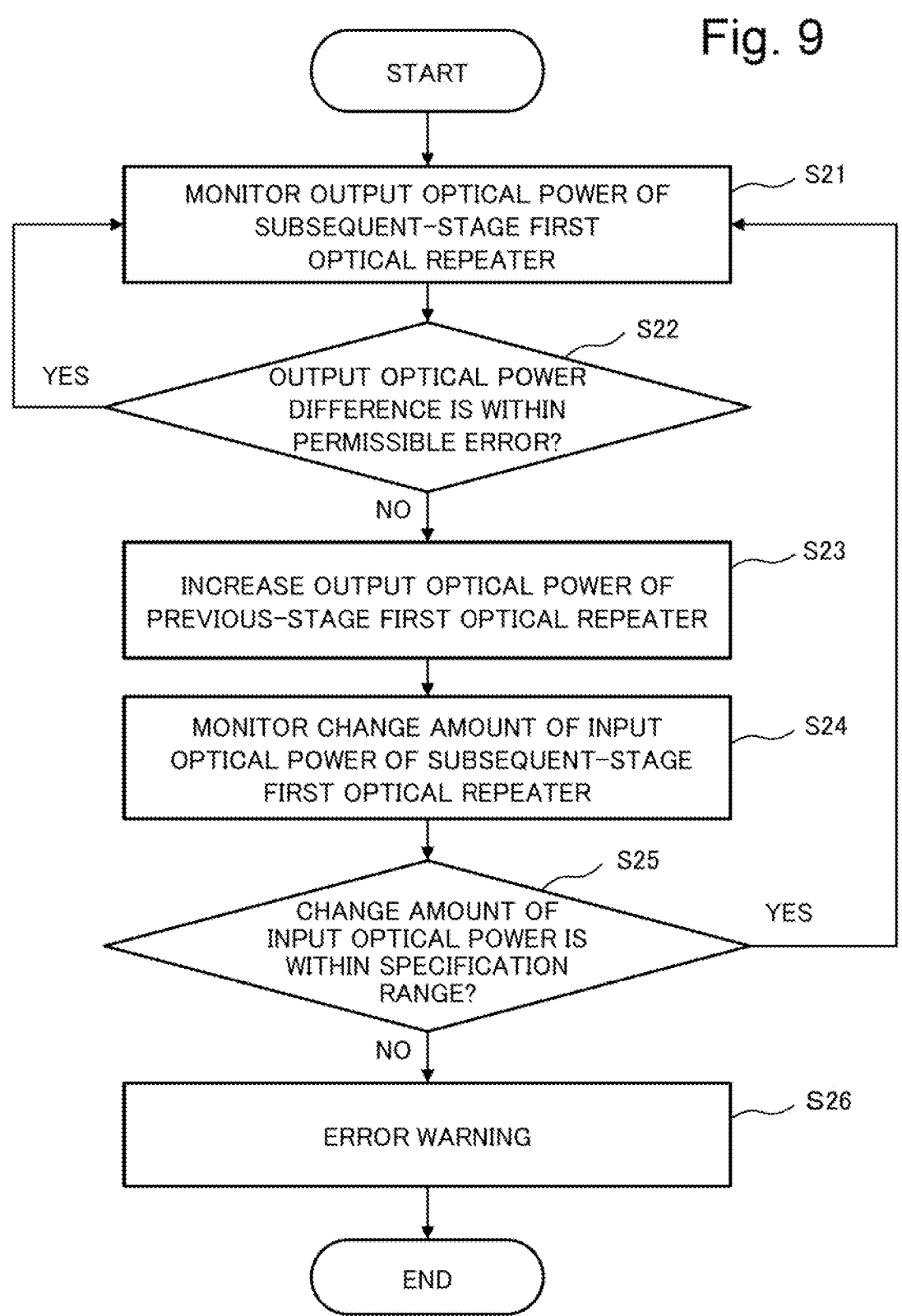

FIG. 9 is a flowchart for describing an operation of a controller included in the optical transmission system according to the second example embodiment of the present invention.

Figure 10:
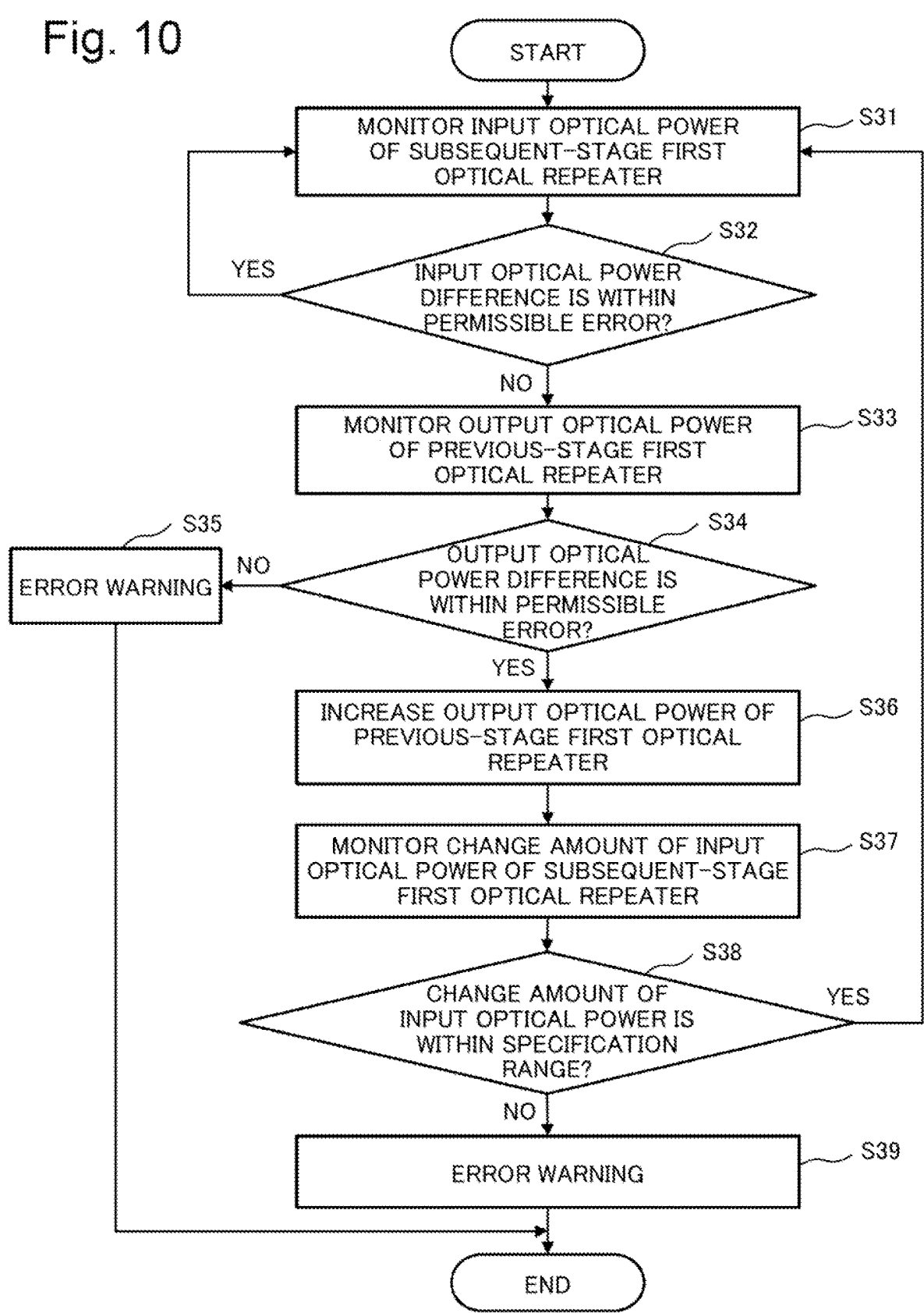

FIG. 10 is a flowchart for describing another operation of the controller included in the optical transmission system according to the second example embodiment of the present invention.

EXAMPLE EMBODIMENT

Hereinafter, example embodiments of the present invention are described with reference to the drawings.

First Example Embodiment

Figure 1:
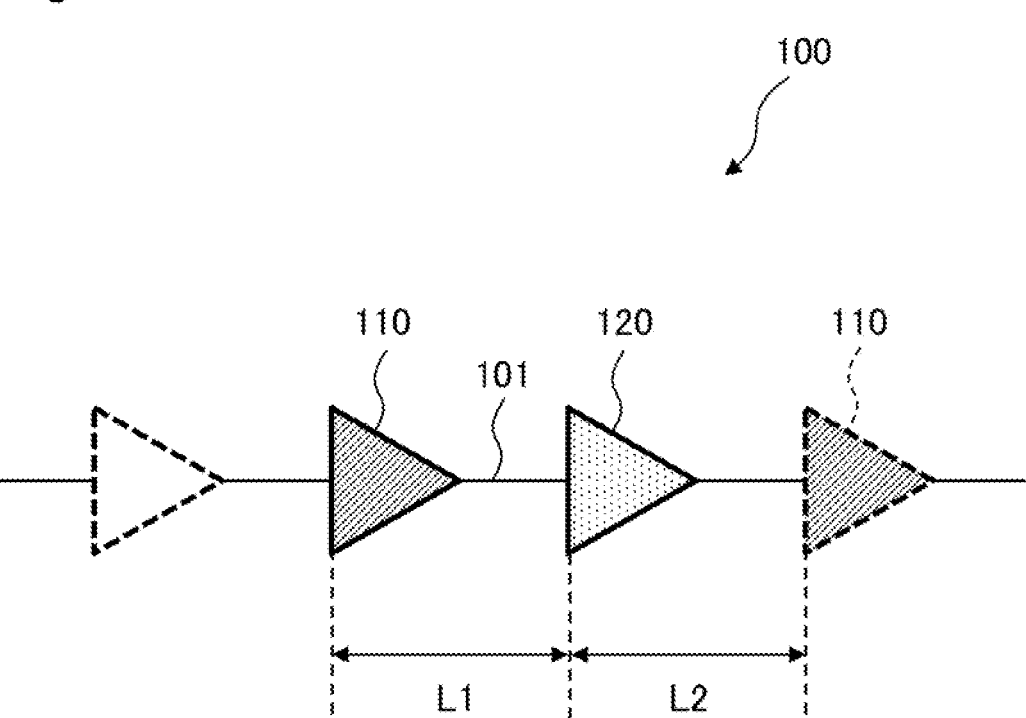
FIG. 1 is a block diagram illustrating a configuration of an optical transmission system according to a first example embodiment of the present invention.

FIG. 1 is a block diagram illustrating a configuration of an optical transmission system 100 according to a first example embodiment of the present invention. The optical transmission system 100 includes a multi-core optical transmission path 101, a first optical repeater (first optical repeating means) 110, and a second optical repeater (second optical repeating means) 120.

The multi-core optical transmission path 101 includes a plurality of cores, and an optical signal propagates through the plurality of cores. The first optical repeater 110 amplifies the optical signal by individually exciting a first multi-core optical amplification medium. Then, the second optical repeater 120 amplifies the optical signal by collectively exciting a second multi-core optical amplification medium. Herein, the first optical repeater 110 is positioned apart from the second optical repeater 120 by a distance determined based on one of a first transmittable distance L1 by the first optical repeater 110 or a second transmittable distance L2 by the second optical repeater 120.

With such a configuration, in the optical transmission system 100 according to the present example embodiment, the first optical repeater 110 is able to individually control optical intensity of an optical signal propagating through each core of the multi-core optical transmission path 101. Further, since the second optical repeater 120 has a configuration that amplifies the optical signal by collectively exciting the second multi-core optical amplification medium, the number of light sources for excitation is fewer than that of the first optical repeater 110. In other words, the optical transmission system 100 according to the present example embodiment is able to suppress an increase in the number of components (hardware amount) of the whole optical transmission system 100, even when having a configuration in which optical intensity of an optical signal propagating through each core of the multi-core optical transmission path 101 is individually controlled.

In an optical transmission system that uses a multi-core optical transmission path, a loss difference occurs between cores within a multi-core optical fiber due to a manufacturing variation, mounting accuracy, and the like of a multi-core optical fiber being a typical example of the multi-core optical transmission path. In a long-distance optical transmission system having a large number of optical repeaters, even such a minute loss difference becomes a loss difference that may not be ignored as the whole optical transmission system, and results in a difference in optical intensity between cores. The difference in optical intensity between cores may not be equalized with a collective excitation (clad excitation) type optical repeater. However, since the optical transmission system according to the present example embodiment has a configuration that includes the first optical repeater 110 of an individual excitation (core excitation) type, power of light to be excited can be controlled for each core according to intensity of an optical signal input to the first optical repeater 110. Thereby, it is possible to equalize optical intensity between cores.

The related optical amplification repeating system described above has a configuration that includes a hybrid excitation method optical amplification repeater for each repeating point. In contrast, the optical transmission system 100 according to the present example embodiment has a configuration in which the first optical repeater 110 of an individual excitation type and the second optical repeater 120 of a collective excitation type are positioned apart from each other by a distance determined based on a transmittable distance at which each of the optical repeaters is able to transmit, i.e., a span length. In other words, the optical transmission system 100 according to the present example embodiment has a configuration that performs hybrid excitation in a group unit of a plurality of optical repeaters, instead of performing hybrid excitation for each optical repeater as in the related optical amplification repeating system. In short, two kinds of optical repeaters being a first optical repeater and a second optical repeater are provided within a multi-core optical transmission path, and individual excitation (core excitation) by the first optical repeater and collective excitation (clad excitation) by the second optical repeater achieve a hybrid excitation method.

Specifically, the first optical repeater 110 and the second optical repeater 120 can configure an optical repeating means group including at least one first optical repeater 110 and at least one second optical repeater 120. Then, the first optical repeater 110 included in each optical repeating means group can be configured to amplify an optical signal in such a way that a difference in optical intensity of optical signals between a plurality of cores included in a multi-core optical transmission path is reduced. With such a configuration, the number of components (hardware amount) can be lessened while individually controlling intensity of an optical signal propagating through each core by the first optical repeater 110 of an individual excitation type and maintaining optical transmission performance.

Figure 2A:
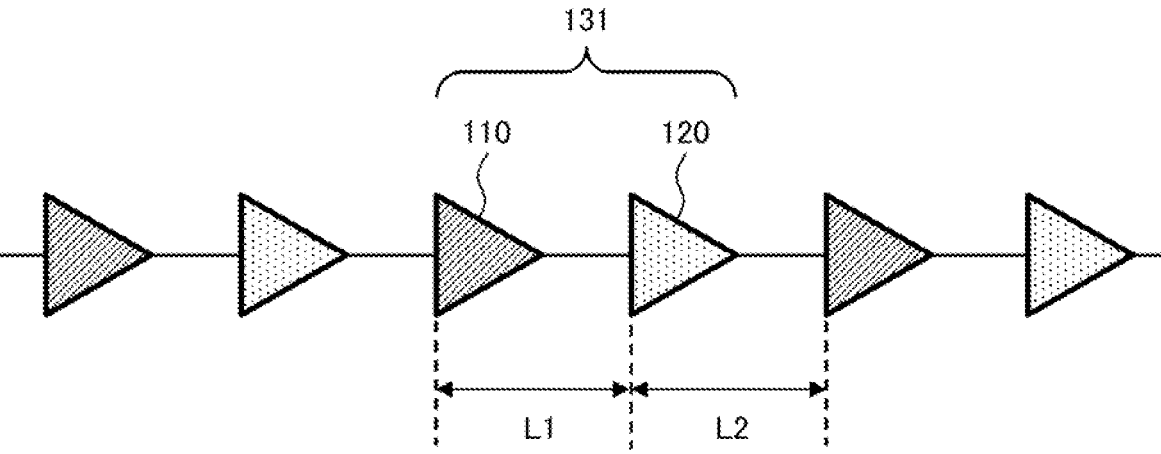
FIG. 2A is a block diagram illustrating a configuration of an optical repeating means group included in the optical transmission system according to the first example embodiment of the present invention.

An optical repeating means group can be, for example, an optical repeating means group 131 including one first optical repeater 110 and one second optical repeater 120, as illustrated in FIG. 2A, when the first transmittable distance L1 is equal to the second transmittable distance L2. In short, a configuration in which the first optical repeater 110 and the second optical repeater 120 are positioned alternately can be provided. For example, a hybrid excitation method can be provided in a unit of an even span and an odd span by installing a core excitation type optical repeater in an even span and a clad excitation type optical repeater in an odd span.

Figure 2B:
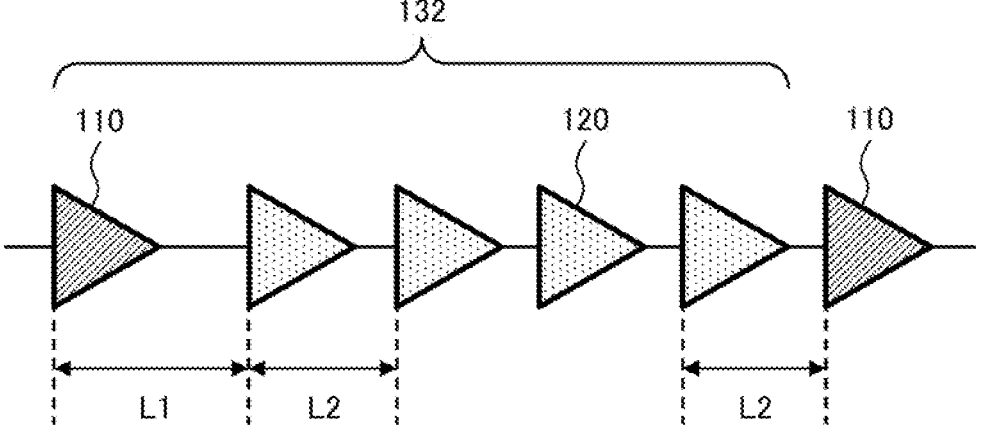
FIG. 2B is a block diagram illustrating another configuration of an optical repeating means group included in the optical transmission system according to the first example embodiment of the present invention.

When the first transmittable distance L1 is larger than the second transmittable distance L2, an optical repeating means group 132 including at least one first optical repeater 110 and a plurality of the second optical repeaters 120 can be provided, as illustrated in FIG. 2B.

Figure 3:
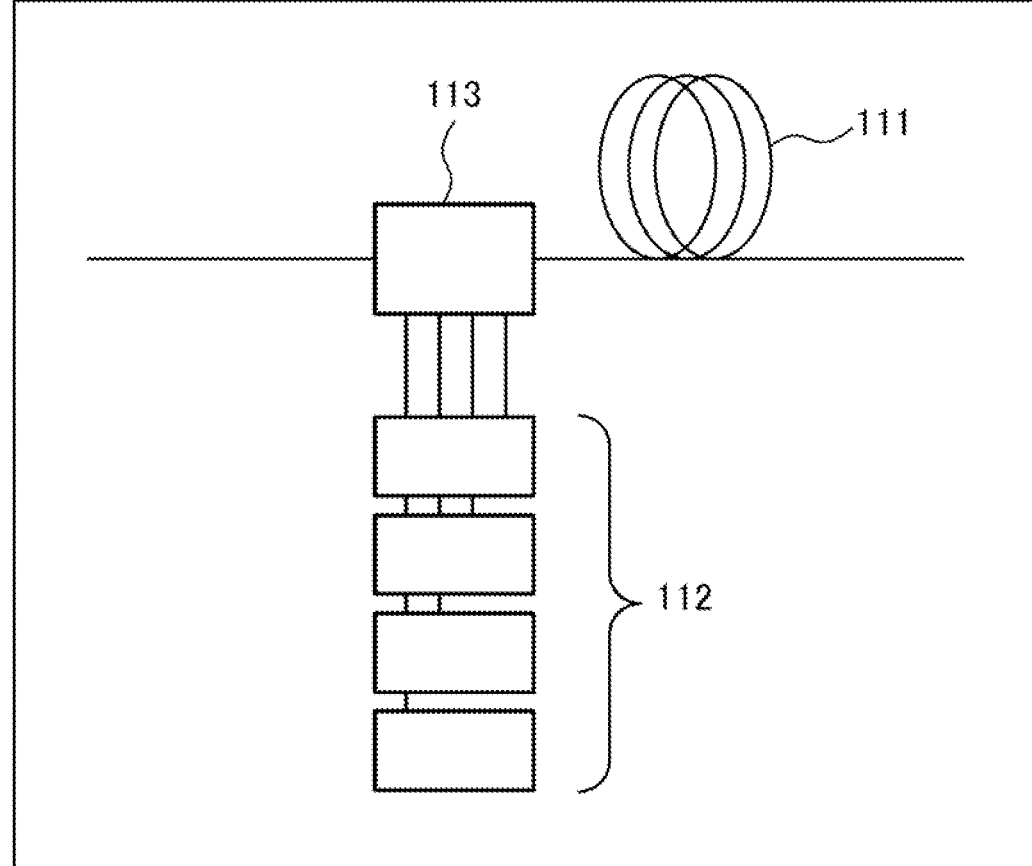
FIG. 3 is a block diagram illustrating a configuration of a first optical repeater included in the optical transmission system according to the first example embodiment of the present invention.

FIG. 3 illustrates a configuration example of the first optical repeater 110. The first optical repeater 110 includes a first multi-core optical fiber 111, a plurality of core excitation lasers 112, and a fan-in/fan-out means 113. The first multi-core optical fiber 111 includes a first multi-core optical amplification medium in each core. As the first multi-core optical fiber 111, a multi-core erbium doped fiber (MC-EDF) can be typically used. Each of the plurality of core excitation lasers 112 generates individual excitation light that individually excites the first multi-core optical amplification medium. Then, the fan-in/fan-out (FIFO) means 113 introduces each individual excitation light into each core of the first multi-core optical fiber. Note that, although the core excitation lasers 112 needs to be provided as many as the number of cores of the first multi-core optical fiber 111, a configuration in which the number of cores is 4, and four core excitation lasers 112 are provided is illustrated in FIG. 3 as one example.

The fan-in/fan-out (FIFO) means 113 causes a loss in an optical signal. Thus, in an optical transmission system equipped with an optical amplification repeater including an optical amplifier according to an individual excitation (core excitation) method at each repeating point, such as a related optical amplification repeating system, such a loss increases, and becomes a cause of shortening of a transmission distance. Particularly, since a submarine optical transmission system needs several hundred optical repeaters as a whole, an influence of an optical loss due to fan-in/fan-out (FIFO) is great. However, the optical transmission system 100 according to the present example embodiment has a configuration that performs hybrid excitation in a group unit of a plurality of optical repeaters. Thus, the number of optical repeaters of an individual excitation (core excitation) type is diminished, and the number of fan-in/fan-outs (FIFOs) can be decreased, and, therefore, an optical loss due to fan-in/fan-out (FIFO) can be lowered. Since the number of optical repeaters of an individual excitation (core excitation) type is diminished, a component needing control is also diminished, and, therefore, an effect of simplifying control can be acquired.

Figure 4:
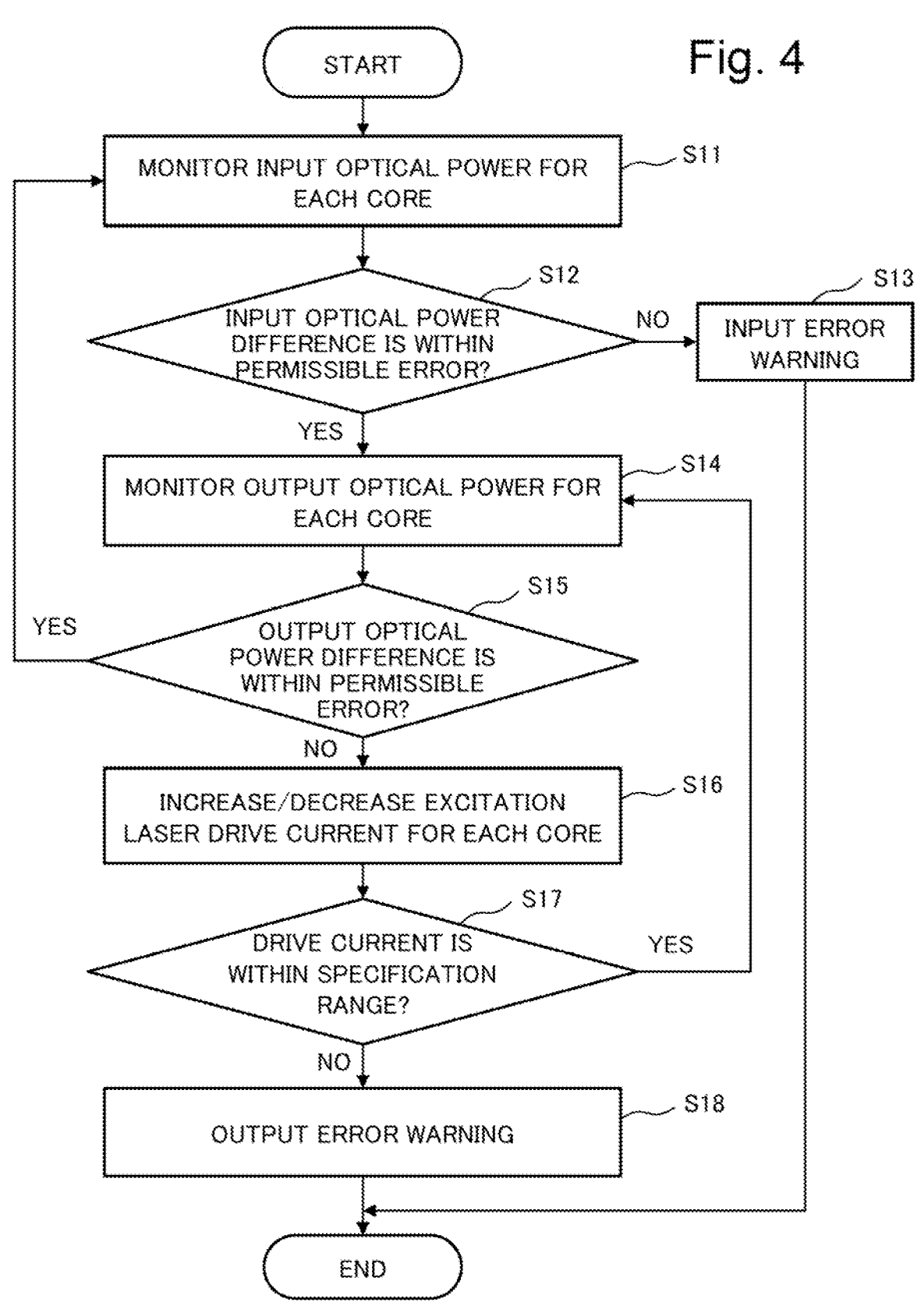
FIG. 4 is a flowchart for describing an operation of the first optical repeater included in the optical transmission system according to the first example embodiment of the present invention.

Next, an operation of the first optical repeater 110 is described. FIG. 4 is a flowchart for describing an operation of the first optical repeater 110.

The first optical repeater 110 first monitors, for each core, power of an optical signal propagating through a plurality of cores of the multi-core optical transmission path 101 and input to the first optical repeater 110 (step S11). Then, whether a difference in power between the cores of an optical signal to be input is within a previously determined range of permissible error is determined (step S12). When the difference in input optical power between cores is not within the previously determined range of permissible error (step S12/NO), the first optical repeater 110 determines an input error, generates a warning (alarm) signal (step S13), and ends the operation.

When the difference in input optical power between cores is within the previously determined range of permissible error (step S12/YES), the first optical repeater 110 monitors, for each core, power of an optical signal to be output (step S14). Then, whether the difference in power between cores of an optical signal to be output is within a previously determined range of permissible error is determined (step S15). When the difference in output optical power between cores is within the previously determined range of permissible error (step S15/YES), the first optical repeater 110 continuously monitors, for each core, power of the optical signal to be input (step S11).

When the difference in output optical power between cores is not within the previously determined range of permissible error (step S15/NO), the first optical repeater 110 increases or decreases drive current of the core excitation laser 112 for each core in a previously determined step (step S16). Then, whether the drive current value of the core excitation laser 112 is within a specification range of each core excitation laser is determined (step S17). When the drive current value of the core excitation laser 112 is within the specification range of each core excitation laser (step S17/YES), the first optical repeater 110 continuously monitors, for each core, power of the optical signal to be output (step S14).

When a drive current value of the core excitation laser 112 is not within the specification range of each core excitation laser (step S17/NO), the first optical repeater 110 determines an output error, and generates a warning (alarm) signal (step S18), and ends the operation.

By the operation described above, the first optical repeater 110 is able to amplify an optical signal in such a way that a difference in optical intensity of an optical signal between a plurality of cores included in the multi-core optical transmission path 101 is reduced.

Figure 5:
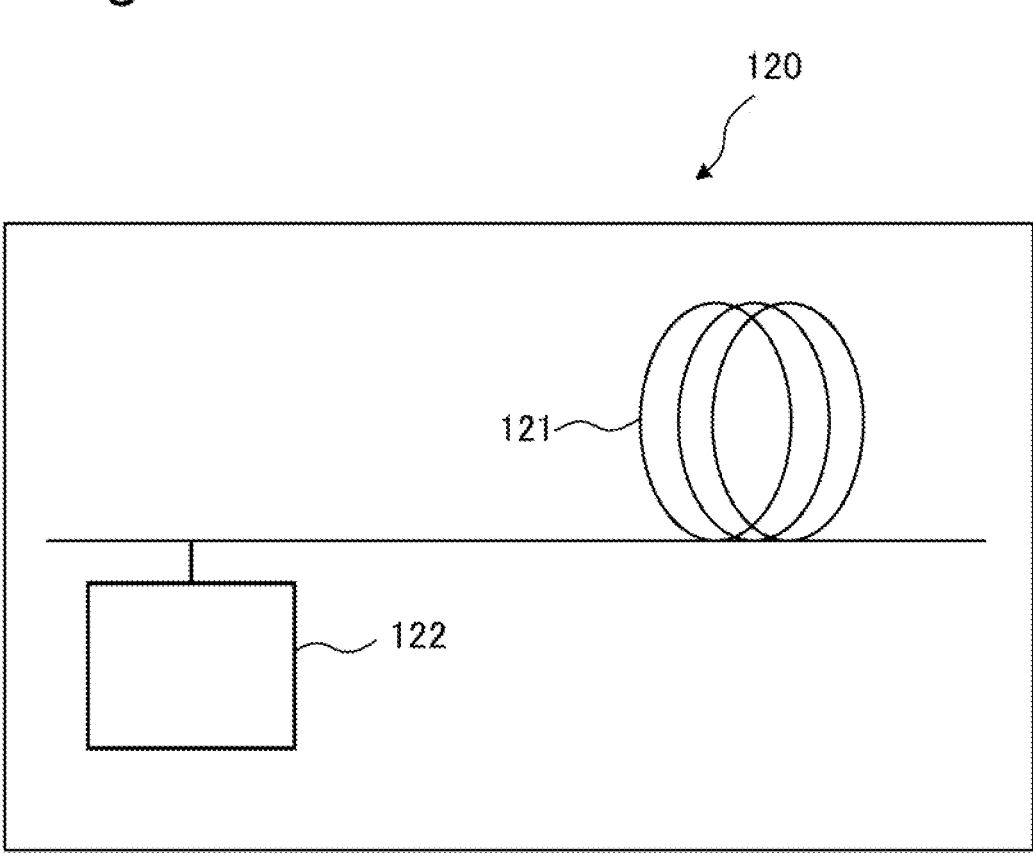
FIG. 5 is a block diagram illustrating a configuration of a second optical repeater included in the optical transmission system according to the first example embodiment of the present invention.

FIG. 5 illustrates a configuration example of the second optical repeater 120. The second optical repeater 120 includes a second multi-core optical fiber 121 and a clad excitation laser 122. The second multi-core optical fiber 121 includes a second multi-core optical amplification medium in each core. As the second multi-core optical fiber 121, a multi-core erbium doped fiber (MC-EDF) can be typically used. The clad excitation laser 122 generates collective excitation light that collectively excites the second multi-core optical amplification medium.

As described above, the optical transmission system 100 according to the present example embodiment is characterized by including two kinds of optical repeaters being the first optical repeater 110 of an individual excitation (core excitation) method and a second optical repeater 120 of a collective excitation (clad excitation) method. Herein, there is no particular limitation on a configuration of each of the first optical repeater 110 and the second optical repeater 120. Therefore, an existing optical repeater of an individual excitation (core excitation) method can be used as the first optical repeater 110, and an existing optical repeater of a collective excitation (clad excitation) method can be used as the second optical repeater 120.

Next, an effect of the optical transmission system 100 according to the present example embodiment is described in more detail.

Figure 6:
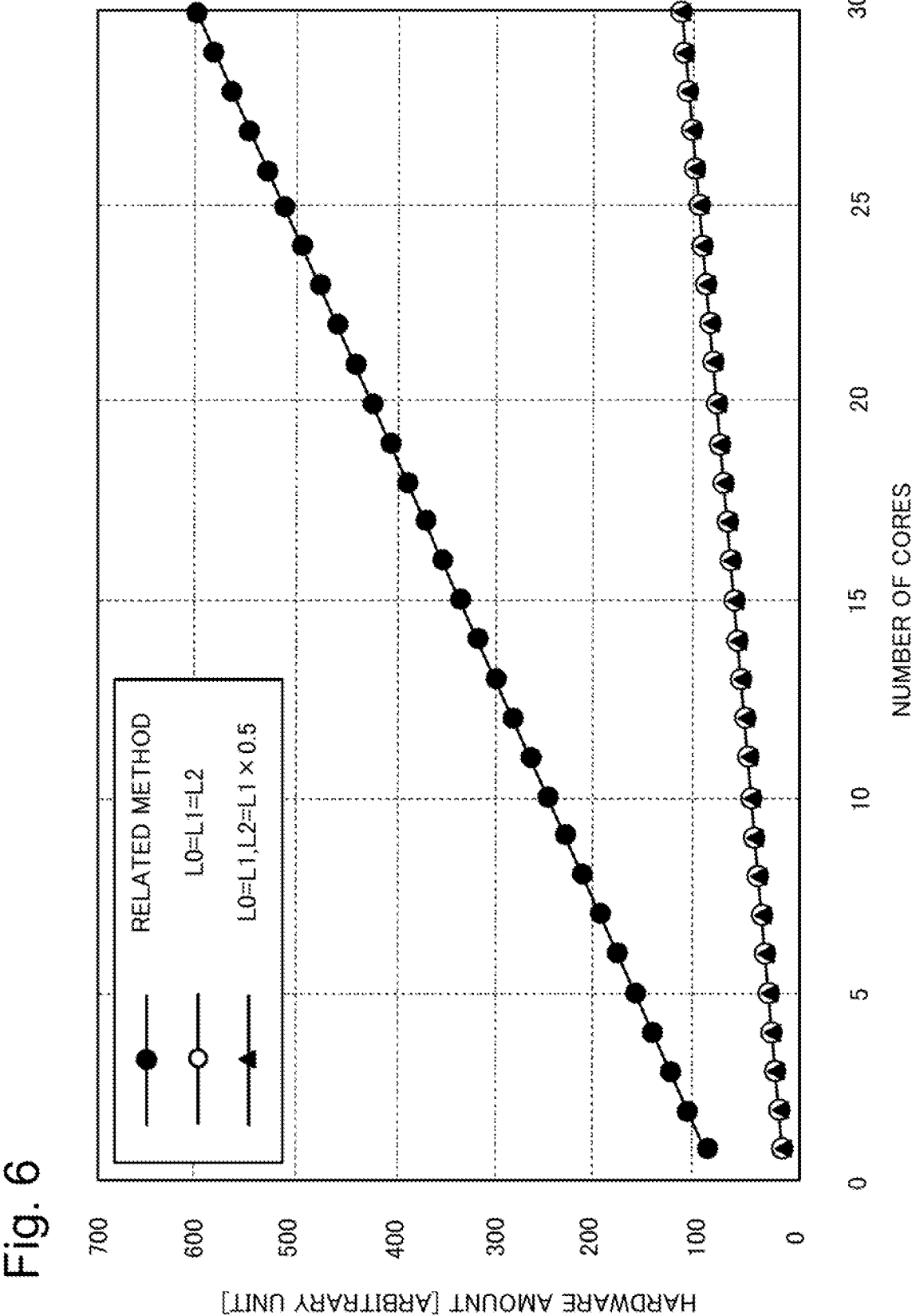
FIG. 6 is a diagram illustrating, for each number of cores of a multi-core optical transmission path, a hardware amount of the whole optical transmission system according to the first example embodiment of the present invention.

FIG. 6 illustrates a hardware amount of the whole optical transmission system for each number of cores in a multi-core optical transmission path. A vertical axis is a hardware amount (the number of components) represented in arbitrary unit, and a horizontal axis is the number of cores in a multi-core optical transmission path.

A black circle (●) in the figure indicates a hardware amount in an optical transmission system according to a related method equipped with, for each repeating point, an optical amplification repeater including an optical amplifier according to the individual excitation (core excitation) method. A white circle (○) and a triangle (▲) in the figure each indicate a hardware amount in the optical transmission system according to the present example embodiment. The white circle (○) indicates a hardware amount when each of the first transmittable distance L1 and the second transmittable distance L2 is equal to a span length L0 in an optical transmission system according to the related method. The triangle (▲) also indicates a hardware amount when the first transmittable distance L1 is equal to the span length L0 in the optical transmission system according to the related method, and the second transmittable distance L2 is half of that of the first transmittable distance L1.

From FIG. 6, it can be understood that the hardware amount is significantly diminished in the optical transmission system according to the present example embodiment (white circle (○) and triangle (▲)) as compared with the optical transmission system according to the related method (black circle (●)). Hereinafter, a specific configuration is described in more detail as an example.

As illustrated in FIG. 7A, a case where five related optical repeaters 10 are used in an optical transmission system according to the related method, and the number of cores in a multi-core optical transmission path is ten is specifically described as an example. In this case, in the optical transmission system according to the related method, all five related optical repeaters 10 are provided with core excitation lasers for the number of cores (ten cores), and, therefore, the whole optical transmission system according to the related method needs 50 lasers.

Next, by use of FIGS. 7B and 7C, a configuration in which one of five optical repeaters is determined as the first optical repeater 110 being a core excitation type, and other optical repeaters are each determined as the second optical repeater 120 being a clad excitation type in the optical transmission system according to the present example embodiment is described. FIG. 7B illustrates a configuration of a case where each of the first transmittable distance L1 by the first optical repeater 110 and the second transmittable distance L2 by the second optical repeater 120 is equal to the span length L0 in the optical transmission system according to the related method. In this case, the first optical repeater 110 being a core excitation type includes ten core excitation lasers for the number of cores (ten cores), and the four second optical repeaters 120 being the clad excitation type each include one clad excitation laser amounting to four clad excitation lasers. Therefore, the number of lasers needed for the whole optical transmission system is 14. In this way, the optical transmission system according to the present example embodiment is able to lower the total number of lasers to be mounted from 50 to 14, as compared with the optical transmission system according to the related method.

FIG. 7C illustrates an optical transmission system configuration according to the present example embodiment in a case where the first transmittable distance L1 is equal to the span length L0 in the optical transmission system according to the related method, and the second transmittable distance L2 is half the first transmittable distance L1. In this case, eight second optical repeaters 120 being twice that in a case where the transmittable distances L1 and L2 are equal (see FIG. 7B) are needed. In short, the first optical repeater 110 being a core excitation type includes ten core excitation lasers for the number of cores (ten cores), and the eight second optical repeaters 120 being the clad excitation type each include one clad excitation laser amounting to a total of eight clad excitation lasers. Therefore, the number of lasers needed for the whole optical transmission system is 18. In this case as well, the optical transmission system according to the present example embodiment is able to lower the total number of lasers to be mounted from 50 to 18, as compared with the optical transmission system according to the related method. In this way, the total number of lasers to be mounted becomes 14 to 18 due to shortening of a transmittable distance by an optical repeater. However, as compared with a case of the optical transmission system according to the related method (50 in total), an influence of the shortening of the transmittable distance by the optical repeater on a hardware amount (the number of components) of the whole optical transmission system is small.

Next, an optical transmission method according to the present example embodiment is described.

In the optical transmission method according to the present example embodiment, first, a first multi-core optical amplification medium and a second multi-core optical amplification medium are located at differing positions on a multi-core optical transmission path, and an optical signal is propagated within a plurality of cores of the multi-core optical transmission path. Then, the optical signal is amplified by individually exciting the first multi-core optical amplification medium, and the optical signal is amplified by collectively exciting the second multi-core optical amplification medium. In this instance, the first multi-core optical amplification medium is positioned apart from the second multi-core optical amplification medium by a distance determined based on one of a first transmittable distance or a second transmittable distance. Herein, the first transmittable distance is a transmittable distance of an optical signal when the first multi-core optical amplification medium is individually excited. The second transmittable distance is a transmittable distance of an optical signal when the second multi-core optical amplification medium is collectively excited.

In this way, the optical transmission method according to the present example embodiment has a configuration that amplifies an optical signal by individually exciting the first multi-core optical amplification medium, and amplifies an optical signal by collectively exciting the second multi-core optical amplification medium at a differing position of the multi-core optical transmission path. Thus, the number of light sources for excitation for individually exciting the multi-core optical amplification medium can be lowered, as compared with the case where a multi-core optical amplification medium is individually excited for each repeating point of a multi-core optical transmission path. In other words, the optical transmission method according to the present example embodiment is able to suppress an increase in the number of components (hardware amount) of the whole optical transmission system, even when having a configuration in which optical intensity of an optical signal propagating through each core of a multi-core optical transmission path is individually controlled.

In the optical transmission method according to the present example embodiment, a first multi-core optical amplification medium and a second multi-core optical amplification medium may be located in such a way as to constitute an optical amplification medium group including at least one first multi-core optical amplification medium and at least one second multi-core optical amplification medium. A configuration can be provided in which individually exciting the first multi-core optical amplification medium includes amplifying an optical signal in such a way that a difference in optical intensity of an optical signal between a plurality of cores is reduced.

As described above, the optical transmission system 100 and the optical transmission method according to the present example embodiment are able to suppress an increase in the number of components of the whole optical transmission system, even when having a configuration in which optical intensity of an optical signal propagating through each core of a multi-core optical transmission path is individually controlled.

Second Example Embodiment

Next, a second example embodiment of the present invention is described. FIG. 8 illustrates a configuration of an optical transmission system 200 according to the present example embodiment.

The optical transmission system 200 includes a multi-core optical transmission path 201, a first optical repeater (first optical repeating means) 210, and a second optical repeater (second optical repeating means) 220.

The multi-core optical transmission path 201 includes a plurality of cores, and an optical signal propagates through the plurality of cores. The first optical repeater 210 amplifies the optical signal by individually exciting a first multi-core optical amplification medium. Then, the second optical repeater 220 amplifies the optical signal by collectively exciting a second multi-core optical amplification medium. Herein, the first optical repeater 210 is positioned apart from the second optical repeater 220 by a distance determined based on one of a first transmittable distance L1 by the first optical repeater 210 or a second transmittable distance L2 by the second optical repeater 220.

Then, the first optical repeater 210 and the second optical repeater 220 constitute an optical repeating means group 230 including at least one first optical repeater 210 and at least one second optical repeater 220. In this instance, the first optical repeater 210 included in each optical repeating means group 230 amplifies an optical signal in such a way that a difference in optical intensity of an optical signal between a plurality of cores included in a multi-core optical transmission path is reduced.

The configuration so far is similar to the configuration of the optical transmission system 100 according to the first example embodiment. In the optical transmission system 200 according to the present example embodiment, the optical repeating means group 230 has a configuration including a previous-stage optical repeating means group 231 and a subsequent-stage optical repeating means group 232. Herein, the previous-stage optical repeating means group 231 is positioned on a previous-stage side of the subsequent-stage optical repeating means group 232.

Then, a previous-stage first optical repeater (previous-stage first optical repeating means) 211 is configured to amplify the optical signal in such a way that a difference in optical intensity of an optical signal between a plurality of cores in a subsequent-stage first optical repeater (subsequent-stage first optical repeating means) 212 is reduced. Herein, the previous-stage first optical repeater 211 is a first optical repeater belonging to the previous-stage optical repeating means group 231. The subsequent-stage first optical repeater 212 is a first optical repeater belonging to the subsequent-stage optical repeating means group 232.

With such a configuration, the optical transmission system 200 according to the present example embodiment is able to suppress an increase in the number of components of the whole optical transmission system 200, even when optical intensity of an optical signal propagating through each core of the multi-core optical transmission path 201 is individually controlled.

Next, an operation of the optical transmission system 200 according to the present example embodiment is described. Herein, an operation of a controller when the optical transmission system 200 includes a controller that is configured to control the previous-stage first optical repeater 211 and the subsequent-stage first optical repeater 212 is described.

The controller is configured to increase optical intensity output by the previous-stage first optical repeater 211, when determining that a difference in optical intensity between a plurality of cores of an optical signal output by the subsequent-stage first optical repeater 212 is larger than a predetermined value. The operation of the controller in this case is described in more detail by use of a flowchart illustrated in FIG. 9.

First, the controller monitors, for each core, power of an optical signal output by the subsequent-stage first optical repeater 212 (step S21). Then, whether a difference in power between cores of the optical signal output by the subsequent-stage first optical repeater 212 is within a previously determined range of permissible error is determined (step S22). When the difference in output optical power between cores is within the previously determined range of permissible error (step S22/YES), the controller continuously monitors, for each core, power of the optical signal to be output by the subsequent-stage first optical repeater 212 (step S21).

When the difference in power between the cores of the optical signal output by the subsequent-stage first optical repeater 212 is not within the previously determined range of permissible error (step S22/NO), the controller increases the power of the optical signal output by the previous-stage first optical repeater 211 (step S23). Thereby, a burden when the subsequent-stage first optical repeater 212 equalizes a difference in output optical power between cores can be lightened.

The controller monitors a change amount in power of an optical signal input to the subsequent-stage first optical repeater 212 in this instance (step S24). Then, the controller determines whether the change amount in the power of the optical signal input to the subsequent-stage first optical repeater 212 is within a specification range of the subsequent-stage first optical repeater 212 (step S25).

When the change amount in the power of the optical signal input to the subsequent-stage first optical repeater 212 is within the specification range of the subsequent-stage first optical repeater 212 (step S25/YES), the controller continuously monitors, for each core, the power of the optical signal output by the subsequent-stage first optical repeater 212 (step S21). Meanwhile, when the change amount in the power of the optical signal input to the subsequent-stage first optical repeater 212 is not within the specification range of the subsequent-stage first optical repeater 212 (step S25/NO), the controller determines an error, generates a warning (alarm) signal (step S26), and ends the operation.

In this way, in the optical transmission system 200 according to the present example embodiment, the controller has a configuration that controls, in cooperation, the subsequent-stage first optical repeater 212, and the previous-stage first optical repeater 211 positioned on a previous-stage side of the subsequent-stage first optical repeater 212. Thus, even when a difference in output optical power between cores is large and it is difficult for the subsequent-stage first optical repeater 212 to perform equalization thereof alone, it becomes possible to equalize the difference in the output optical power between the cores.

A case where the controller determines that a difference in optical intensity between a plurality of cores of an optical signal input to the subsequent-stage first optical repeater 212 is larger than a predetermined value, and a difference in optical intensity between a plurality of cores of an optical signal output by the previous-stage first optical repeater 211 is smaller than a predetermined value is described. In this case, the controller can be configured to increase optical intensity output by the previous-stage first optical repeater 211. The operation of the controller in this case is described in more detail by use of a flowchart illustrated in FIG. 10.

First, the controller monitors, for each core, power of an optical signal input by the subsequent-stage first optical repeater 212 (step S31). Then, whether a difference in power between cores of the optical signal input by the subsequent-stage first optical repeater 212 is within a previously determined range of permissible error is determined (step S32). When the difference in the input optical power between the cores is within the previously determined range of permissible error (step S32/YES), the controller continuously monitors, for each core, the power of the optical signal input by the subsequent-stage first optical repeater 212 (step S31).

When the difference in power between the cores of the optical signal input by the subsequent-stage first optical repeater 212 is not within the previously determined range of permissible error (step S32/NO), an abnormality has occurred in an optical repeater or a multi-core optical transmission path positioned closer to a previous-stage side than the subsequent-stage first optical repeater 212. Accordingly, next, the controller monitors, for each core, the power of the optical signal output by the previous-stage first optical repeater 211 (step S33). Then, whether the difference in power between the cores of the optical signal output by the previous-stage first optical repeater 211 is within a previously determined range of permissible error is determined (step S34). When the difference in output optical power between the cores is not within the previously determined range of permissible error (step S34/NO), the controller determines that the previous-stage first optical repeater 211 does not operate normally, generates an error warning (alarm) signal (step S35), and ends the operation.

When the difference in power between the cores of the optical signal output by the previous-stage first optical repeater 211 is within a previously determined range of permissible error (step S34/YES), it can be understood that the previous-stage first optical repeater 211 normally performs an operation of equalizing the difference in power between the cores. Therefore, in this case, an abnormality has occurred in the second optical repeater 220 of the collective excitation (clad excitation) method or the multi-core optical transmission path positioned between the previous-stage first optical repeater 211 and the subsequent-stage first optical repeater 212. Thus, the controller increases power of the optical signal output by the previous-stage first optical repeater 211 (step S36). Thereby, a burden when the subsequent-stage first optical repeater 212 equalizes a difference in output optical power between cores can be lightened.

The controller monitors a change amount in the power of the optical signal input to the subsequent-stage first optical repeater 212 in this instance (step S37). Then, the controller determines whether the change amount in the power of the optical signal input to the subsequent-stage first optical repeater 212 is within a specification range of the subsequent-stage first optical repeater 212 (step S38).

When the change amount in the power of the optical signal input to the subsequent-stage first optical repeater 212 is within the specification range of the subsequent-stage first optical repeater 212 (step S38/YES), the controller continuously monitors, for each core, the power of the optical signal input by the subsequent-stage first optical repeater 212 (step S31). Meanwhile, when the change amount in the power of the optical signal input to the subsequent-stage first optical repeater 212 is not within the specification range of the subsequent-stage first optical repeater 212 (step S38/NO), the controller determines an error, generates a warning (alarm) signal (step S39), and ends the operation.

In the above-described optical transmission system 200 according to the present example embodiment as well, the controller has a configuration that controls, in cooperation, the subsequent-stage first optical repeater 212, and the previous-stage first optical repeater 211 positioned on a previous-stage side of the subsequent-stage first optical repeater 212. Thus, even when a difference in output optical power between cores is large and it is difficult for the subsequent-stage first optical repeater 212 to perform equalization thereof alone, it becomes possible to equalize the difference in the output optical power between the cores.

Next, an optical transmission method according to the present example embodiment is described.

In the optical transmission method according to the present example embodiment, first, a first multi-core optical amplification medium and a second multi-core optical amplification medium are located at differing positions on a multi-core optical transmission path, and an optical signal is propagated within a plurality of cores of the multi-core optical transmission path. Then, the optical signal is amplified by individually exciting the first multi-core optical amplification medium, and the optical signal is amplified by collectively exciting the second multi-core optical amplification medium. In this instance, the first multi-core optical amplification medium is positioned apart from the second multi-core optical amplification medium by a distance determined based on one of a first transmittable distance or a second transmittable distance. Herein, the first transmittable distance is a transmittable distance of an optical signal when the first multi-core optical amplification medium is individually excited. The second transmittable distance is a transmittable distance of an optical signal when the second multi-core optical amplification medium is collectively excited.

Further, a first multi-core optical amplification medium and a second multi-core optical amplification medium are located in such a way as to constitute an optical amplification medium group including at least one first multi-core optical amplification medium and at least one second multi-core optical amplification medium. Then, a configuration is provided in which individually exciting the first multi-core optical amplification medium includes amplifying an optical signal in such a way that a difference in optical intensity of an optical signal between a plurality of cores is reduced.

The configuration so far is similar to that of the optical transmission method according to the first example embodiment. In the optical transmission method according to the present example embodiment, an optical amplification medium group includes a previous-stage optical amplification medium group and a subsequent-stage optical amplification medium group, and the previous-stage optical amplification medium group is positioned on a previous-stage side of the subsequent-stage optical amplification medium group. Then, when a previous-stage first optical amplification medium is individually excited, an optical signal is amplified in such a way that a difference in optical intensity of an optical signal between a plurality of cores in a subsequent-stage first optical amplification medium is reduced. Herein, the previous-stage first optical amplification medium is a first multi-core optical amplification medium belonging to the previous-stage optical amplification medium group. The subsequent-stage first optical amplification medium is a first multi-core optical amplification medium belonging to the subsequent-stage optical amplification medium group.

An optical signal can be amplified, in a case where a difference in optical intensity of an optical signal amplified and output by a subsequent-stage first optical amplification medium between a plurality of cores is larger than a predetermined value when a previous-stage first optical amplification medium is individually excited. An optical signal may be amplified, in a case where a difference in optical intensity of an optical signal input to a subsequent-stage first optical amplification medium between a plurality of cores is larger than a predetermined value and a difference in optical intensity of an optical signal amplified and output by a previous-stage first optical amplification medium between a plurality of cores is smaller than a predetermined value.

As described above, the optical transmission system 200 and the optical transmission method according to the present example embodiment are able to suppress an increase in the number of components of the whole optical transmission system, even when having a configuration in which optical intensity of an optical signal propagating through each core of the multi-core optical transmission path is individually controlled. Further, even when a difference in output optical power between cores is large and it is difficult for an optical repeater to perform equalization thereof alone, it becomes possible to equalize the difference in the output optical power between the cores.

The whole or part of the example embodiments disclosed above can be described as, but not limited to, the following supplementary notes.

Supplementary Note 1

An optical transmission system including: a multi-core optical transmission path that includes a plurality of cores, and in which an optical signal propagates through the plurality of cores; a first optical repeating means for amplifying the optical signal by individually exciting a first multi-core optical amplification medium; and a second optical repeating means for amplifying the optical signal by collectively exciting a second multi-core optical amplification medium, wherein the first optical repeating means is positioned apart from the second optical repeating means by a distance determined based on one of a first transmittable distance by the first optical repeating means and a second transmittable distance by the second optical repeating means.

Supplementary Note 2

The optical transmission system according to supplementary note 1, wherein the first optical repeating means and the second optical repeating means constitute an optical repeating means group including at least one of the first optical repeating means and at least one of the second optical repeating means, and the first optical repeating means included in each optical repeating means group is configured to amplify the optical signal in such a way that a difference in optical intensity of the optical signal between the plurality of cores is reduced.

Supplementary Note 3

The optical transmission system according to supplementary note 2, wherein the optical repeating means group includes a previous-stage optical repeating means group and a subsequent-stage optical repeating means group, the previous-stage optical repeating means group is positioned on a previous-stage side of the subsequent-stage optical repeating means group, and a previous-stage first optical repeating means being the first optical repeating means belonging to the previous-stage optical repeating means group is configured to amplify the optical signal in such a way that a difference in optical intensity of the optical signal among the plurality of cores in a subsequent-stage first optical repeating means being the first optical repeating means belonging to the subsequent-stage optical repeating means group is reduced.

Supplementary Note 4

The optical transmission system according to supplementary note 3, further including a controller configured to control the previous-stage first optical repeating means and the subsequent-stage first optical repeating means, wherein the controller is configured to increase optical intensity being output by the previous-stage first optical repeating means, when determining that a difference in optical intensity among the plurality of cores of the optical signal being output by the subsequent-stage first optical repeating means is larger than a predetermined value.

Supplementary Note 5

The optical transmission system according to supplementary note 3, further including a controller configured to control the previous-stage first optical repeating means and the subsequent-stage first optical repeating means, wherein the controller is configured to increase optical intensity being output by the previous-stage first optical repeating means, when determining that a difference in optical intensity among the plurality of cores of the optical signal being input to the subsequent-stage first optical repeating means is larger than a predetermined value, and a difference in optical intensity among the plurality of cores of the optical signal being output by the previous-stage first optical repeating means is smaller than a predetermined value.

Supplementary Note 6

The optical transmission system according to any one of supplementary notes 1 to 5, wherein the first transmittable distance is equal to the second transmittable distance, and the first optical repeating means and the second optical repeating means are positioned alternately.

Supplementary Note 7

The optical transmission system according to any one of supplementary notes 2 to 5, wherein the first transmittable distance is larger than the second transmittable distance, and the optical repeating means group includes at least one of the first optical repeating means and a plurality of the second optical repeating means.

Supplementary Note 8

The optical transmission system according to any one of supplementary notes 1 to 7, wherein the first optical repeating means includes a first multi-core optical fiber including the first multi-core optical amplification medium in each core, a plurality of core excitation lasers each of which is configured to generate individual excitation light to excite the first multi-core optical amplification medium individually, and a fan-in/fan-out means for introducing the individual excitation light into each core of the first multi-core optical fiber, and the second optical repeating means includes a second multi-core optical fiber including the second multi-core optical amplification medium in each core, and a clad excitation laser configured to generate collective excitation light to excite the second multi-core optical amplification medium collectively.

Supplementary Note 9

An optical transmission method including: locating a first multi-core optical amplification medium and a second multi-core optical amplification medium at different positions of a multi-core optical transmission path; propagating an optical signal through a plurality of cores of the multi-core optical transmission path; amplifying the optical signal by individually exciting the first multi-core optical amplification medium; and amplifying the optical signal by collectively exciting the second multi-core optical amplification medium, wherein the first multi-core optical amplification medium is positioned apart from the second multi-core optical amplification medium by a distance determined based on one of a first transmittable distance of the optical signal when the first multi-core optical amplification medium is individually excited, and a second transmittable distance of the optical signal when the second multi-core optical amplification medium is collectively excited.

Supplementary Note 10

The optical transmission method according to supplementary note 9, further including: locating the first multi-core optical amplification medium and the second multi-core optical amplification medium in such a way as to constitute an optical amplification medium group including at least one of the first multi-core optical amplification medium and at least one of the second multi-core optical amplification medium, wherein the individually exciting the first multi-core optical amplification medium includes amplifying the optical signal in such a way that a difference in optical intensity of the optical signal among the plurality of cores is reduced.

Supplementary Note 11

The optical transmission method according to supplementary note 10, wherein the optical amplification medium group includes a previous-stage optical amplification medium group and a subsequent-stage optical amplification medium group, the previous-stage optical amplification medium group is located on a previous-stage side of the subsequent-stage optical amplification medium group, and the individually exciting a previous-stage first optical amplification medium being the first multi-core optical amplification medium belonging to the previous-stage optical amplification medium group includes amplifying the optical signal in such a way that a difference in optical intensity of the optical signal among the plurality of cores in a subsequent-stage first optical amplification medium being the first multi-core optical amplification medium belonging to the subsequent-stage optical amplification medium group is reduced.

Supplementary Note 12

The optical transmission method according to supplementary note 11, wherein the individually exciting the previous-stage first optical amplification medium includes amplifying the optical signal when a difference in optical intensity, among the plurality of cores, of the optical signal amplified and output by the subsequent-stage first optical amplification medium is larger than a predetermined value.

Supplementary Note 13

The optical transmission method according to supplementary note 11, wherein the individually exciting the previous-stage first optical amplification medium includes amplifying the optical signal when a difference in optical intensity, among the plurality of cores, of the optical signal being input to the subsequent-stage first optical amplification medium is larger than a predetermined value, and a difference in optical intensity, among the plurality of cores, of the optical signal amplified and output by the previous-stage first optical amplification medium is smaller than a predetermined value.

Supplementary Note 14

The optical transmission method according to any one of supplementary notes 9 to 13, wherein the locating the first multi-core optical amplification medium and the second multi-core optical amplification medium includes alternately locating the first multi-core optical amplification medium and the second multi-core optical amplification medium when the first transmittable distance is equal to the second transmittable distance.

Supplementary Note 15

The optical transmission method according to any one of supplementary notes 10 to 13, wherein the locating the first multi-core optical amplification medium and the second multi-core optical amplification medium includes locating the first multi-core optical amplification medium and the second multi-core optical amplification medium in such a way as to constitute the optical amplification medium group including at least one of the first multi-core optical amplification medium and a plurality of the second multi-core optical amplification media when the first transmittable distance is larger than the second transmittable distance.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

100, 200 Optical transmission system
101, 201 Multi-core optical transmission path
110, 210 First optical repeater
111 First multi-core optical fiber
112 Core excitation laser
113 Fan-in/fan-out means
120, 220 Second optical repeater
121 Second multi-core optical fiber
122 Clad excitation laser
131, 132, 230 Optical repeating means group
211 Previous-stage first optical repeater
212 Subsequent-stage first optical repeater
231 Previous-stage optical repeating means group
232 Subsequent-stage optical repeating means group
10 Related optical repeater

What is claimed is:

1. An optical transmission system comprising:
   a multi-core optical transmission path that includes a plurality of cores, and in which an optical signal propagates through the plurality of cores;
   a first optical amplifier configured to amplify the optical signal by individually exciting a first multi-core optical amplification medium; and
   a second optical amplifier configured to amplify the optical signal by collectively exciting a second multi-core optical amplification medium, wherein
   a first transmittable distance by the first optical amplifier is equal to a second transmittable distance by the second optical amplifier, and
   the first optical amplifier and the second optical amplifier are positioned alternately.

2. The optical transmission system according to claim 1, wherein
   the first optical amplifier and the second optical amplifier constitute an optical amplifier group including at least one of the first optical amplifier and at least one of the second optical amplifier, and
   the first optical amplifier included in each optical amplifier group is configured to amplify the optical signal in such a way that a difference in optical intensity of the optical signal between the plurality of cores is reduced.

3. The optical transmission system according to claim 2, wherein
   the optical amplifier group includes a previous-stage optical amplifier group and a subsequent-stage optical amplifier group,
   the previous-stage optical amplifier group is positioned on a previous-stage side of the subsequent-stage optical amplifier group, and
   a previous-stage first optical amplifier being the first optical amplifier belonging to the previous-stage optical amplifier group is configured to amplify the optical signal in such a way that a difference in optical intensity of the optical signal among the plurality of cores in a subsequent-stage first optical amplifier being the first optical amplifier belonging to the subsequent-stage optical amplifier group is reduced.

4. The optical transmission system according to claim 3, further comprising
   a controller configured to control the previous-stage first optical amplifier and the subsequent-stage first optical amplifier, wherein
   the controller is configured to increase optical intensity being output by the previous-stage first optical amplifier, when determining that a difference in optical intensity among the plurality of cores of the optical signal being output by the subsequent-stage first optical amplifier is larger than a predetermined value.

5. The optical transmission system according to claim 3, further comprising
   a controller configured to control the previous-stage first optical amplifier and the subsequent-stage first optical amplifier, wherein
   the controller is configured to increase optical intensity being output by the previous-stage first optical amplifier, when determining that a difference in optical intensity among the plurality of cores of the optical signal being input to the subsequent-stage first optical amplifier is larger than a predetermined value, and a difference in optical intensity among the plurality of cores of the optical signal being output by the previous-stage first optical amplifier is smaller than a predetermined value.

6. The optical transmission system according to claim 1, wherein the first optical amplifier includes a first multi-core optical fiber including the first multi-core optical amplification medium in each core, a plurality of core excitation lasers each of which is configured to generate individual excitation light to excite the first multi-core optical amplification medium individually, and a fan-in/fan-out configured to introduce the individual excitation light into each core of the first multi-core optical fiber, and the second optical amplifier includes a second multi-core optical fiber including the second multi-core optical amplification medium in each core, and a clad excitation laser configured to generate collective excitation light to excite the second multi-core optical amplification medium collectively.

7. An optical transmission method comprising:

locating a first multi-core optical amplification medium and a second multi-core optical amplification medium at different positions of a multi-core optical transmission path;

propagating an optical signal through a plurality of cores of the multi-core optical transmission path;

amplifying the optical signal by individually exciting the first multi-core optical amplification medium; and amplifying the optical signal by collectively exciting the second multi-core optical amplification medium, wherein the locating the first multi-core optical amplification medium and the second multi-core optical amplification medium includes alternately locating the first multi-core optical amplification medium and the second multi-core optical amplification medium when a first transmittable distance of the optical signal when the first multi-core optical amplification medium is individually excited is equal to a second transmittable distance of the optical signal when the second multi-core optical amplification medium is collectively excited.

8. The optical transmission method according to claim 7, further comprising locating the first multi-core optical amplification medium and the second multi-core optical amplification medium in such a way as to constitute an optical amplification medium group including at least one of the first multi-core optical amplification medium and at least one of the second multi-core optical amplification medium, wherein the individually exciting the first multi-core optical amplification medium includes amplifying the optical signal in such a way that a difference in optical intensity of the optical signal among the plurality of cores is reduced.

9. The optical transmission method according to claim 8, wherein the optical amplification medium group includes a previous-stage optical amplification medium group and a subsequent-stage optical amplification medium group, the previous-stage optical amplification medium group is located on a previous-stage side of the subsequent-stage optical amplification medium group, and the individually exciting a previous-stage first optical amplification medium being the first multi-core optical amplification medium belonging to the previous-stage optical amplification medium group includes amplifying the optical signal in such a way that a difference in optical intensity of the optical signal among the plurality of cores in a subsequent-stage first optical amplification medium being the first multi-core optical amplification medium belonging to the subsequent-stage optical amplification medium group is reduced.

10. The optical transmission method according to claim 9, wherein the individually exciting the previous-stage first optical amplification medium includes amplifying the optical signal when a difference in optical intensity, among the plurality of cores, of the optical signal amplified and output by the subsequent-stage first optical amplification medium is larger than a predetermined value.

11. The optical transmission method according to claim 9, wherein the individually exciting the previous-stage first optical amplification medium includes amplifying the optical signal when a difference in optical intensity, among the plurality of cores, of the optical signal being input to the subsequent-stage first optical amplification medium is larger than a predetermined value, and a difference in optical intensity, among the plurality of cores, of the optical signal amplified and output by the previous-stage first optical amplification medium is smaller than a predetermined value.

* * * * *